United States Patent [19]

Thomas et al.

[11] Patent Number: 4,631,683

[45] Date of Patent: Dec. 23, 1986

[54] ACOUSTIC DETECTION OF CONTACT BETWEEN CUTTING TOOL AND WORKPIECE

[75] Inventors: Charles E. Thomas, Scotia; Minyoung Lee, Schenectady; James F. Bedard, Schenectady; Steven R. Hayashi, Schenectady; William S. Yerazunis, Troy, all of N.Y.

[73] Assignee: General Electric Company, Schenectady, N.Y.

[21] Appl. No.: 645,203

[22] Filed: Aug. 29, 1984

[51] Int. Cl.$^4$ .................... G06F 15/46; G01N 24/04; G01M 7/00

[52] U.S. Cl. .................... 364/474; 364/183; 364/184; 364/508; 371/62; 371/64; 307/231; 307/234; 377/16; 318/563; 73/609; 73/613; 73/660

[58] Field of Search ............... 364/474, 475, 183–186, 364/176, 178, 153, 508, 550, 602; 371/62, 64; 307/231, 234; 377/16, 20; 318/460, 563, 632, 636; 73/593, 609, 611, 613, 660, 661

[56] References Cited

U.S. PATENT DOCUMENTS

| | | | |
|---|---|---|---|
| 3,590,670 | 7/1971 | Thompson | 82/1 R |
| 3,822,385 | 6/1974 | Kayalioglu | 307/234 |
| 3,961,271 | 6/1976 | Zlydak et al. | 307/234 |
| 4,118,792 | 10/1978 | Struger et al. | 364/184 |
| 4,270,041 | 5/1981 | Pleyber | 364/550 |
| 4,287,565 | 9/1981 | Haubner et al. | 364/186 |
| 4,355,359 | 10/1982 | Kanegoe et al. | 371/62 |
| 4,374,423 | 2/1983 | Kundler et al. | 377/16 |
| 4,428,055 | 1/1984 | Zurbrick et al. | 364/474 |
| 4,451,185 | 5/1984 | Yamakage | 364/474 |
| 4,451,892 | 6/1984 | McMurty | 364/474 |
| 4,471,444 | 9/1984 | Yee et al. | 364/508 |
| 4,495,621 | 1/1985 | Nakagomi et al. | 371/6 |
| 4,520,674 | 6/1985 | Canada et al. | 364/508 |
| 4,558,311 | 12/1985 | Forsgren et al. | 73/660 |
| 4,562,392 | 12/1985 | Davis et al. | 364/474 |

OTHER PUBLICATIONS

Harting, D. R., "Demodulated Resonance Analysis—A Powerful New Incipient Failure Detection Technique", 23d International Instrumentation Symposium, May 1–5, 1977, pp. 493–498.

Primary Examiner—Jerry Smith
Assistant Examiner—John R. Lastova
Attorney, Agent, or Firm—Donald R. Campbell; James C. Davis, Jr.; Paul R. Webb, III

[57] ABSTRACT

A system and method for monitoring vibrations of a machine tool metal-cutting tool insert and interpreting them to promptly detect the initial touch to the workpiece and signal the tool to stop advancing before marring the surface. The signal generated by a sensor such as an accelerometer is preprocessed to eliminate lower frequency machine noise and detect the energy in a higher frequency band, then sampled and analyzed by digital circuitry. In order to avoid false alarms on high amplitude spiky noise pulses generated by traverse operation of the machine tool, the tool touch alarm is delayed longer than the maximum duration of the noise pulses. Two techniques are given to ignore the noise spikes while still detecting the tool touch signal.

14 Claims, 15 Drawing Figures

ACOUSTIC DETECTION OF CONTACT BETWEEN CUTTING TOOL AND WORKPIECE

BACKGROUND OF THE INVENTION

This invention relates to a machine tool monitor and method for sensing the vibrations of a cutting tool to detect the initial touch to the workpiece, for on-line measurement of workpiece dimensions.

In machining of complex metal parts, such as aircraft engine parts, the dimensions of each part may have to be checked up to nearly 100 times during the machining process. The time required to do this is a significant fraction of the total machining time, and thus has a significant effect on productivity in the machining process. A flexible method of using the tool itself for parts dimensioning reduces the time devoted to this function and increases productivity. Since the tool is capable of damaging the part if its advance is not stopped precisely at the workpiece surface, the tool touch sensing system must be very sensitive and very fast.

Many different off-line and on-line techniques for parts dimensioning have been developed or proposed. The latter includes laser interferometry and the retractable touch trigger probe. A technique using the tool itself to detect tool-workpiece contact by sensing tool vibration is described in U.S. Pat. No. 4,428,055 to J. R. Zurbrick and J. R. Kelley. This invention is an improvement over the foregoing and other prior art systems to reduce false alarms and have greater sensitivity.

In order to detect the initial touch of the advancing cutting tool to the workpiece surface before the tool can mar the workpiece, the tool touch detector must detect the very low vibration signal produced by a light rubbing contact. To avoid false alarms the tool touch sensing system must ignore or reject all other signals. Field tests have shown that operation of some lathes during touch tests produces spiky noise with an amplitude that can exceed that of the light rubbing contact signal by a factor of 100 or more in spite of the use of frequency domain discrimination against the usually low frequency machinery noise sources. The problem is to reject these high amplitude, short duration noise pulses while still retaining prompt detection of the low amplitude continuous light rubbing contact signal.

SUMMARY OF THE INVENTION

An object of the invention is to provide a tool touch detection system which requires less delay than competing devices not using the cutting tool as a probe, and is less costly to implement than many competing systems.

Another object is to provide an improved tool touch detector which has adequate sensitivity and immunity to false alarms in most lathe and machine tool installations.

A further object is the provision of such a monitor that can be easily integrated with an acoustic tool break detector in a combined tool break and tool touch detecting system.

A vibration sensor such as an accelerometer which is most sensitive to frequencies around a resonant frequency is positioned on the machine tool to sense vibrations at the tool-workpiece interface. An analog preprocessor has means for high-pass filtering and amplifying the vibration signal to discriminate against lower frequency machinery noise, and means for rectifying and low-pass filtering the signal to detect the energy in a band around the resonant frequency. The cutoff frequency of the low-pass filter is less than 500 Hz to prevent aliasing by the subsequent sampling operation. The unipolar output signal of the analog preprocessor is sampled, and the samples are converted to digital form and analyzed by digital circuitry, which can be a programmable general purpose computer. Means are provided for comparing every sample with a known amplitude threshold level which is a minimum factor above the continuous traverse noise signal level produced by operation of the machine tool with no tool-workpiece contact, and for generating a tool touch alarm signal promptly following detection of at least one sample amplitude above the threshold, to be sent to the machine tool control to stop the advance of the tool.

The preferred embodiments have pattern recognition logic for confirming a valid tool touch after detection of one above-threshold sample and ignoring the pre-touch spiky noise pulses to prevent false alarms. The tool touch alarm is delayed a period longer than the known maximum duration of the high amplitude noise pulses. One method is to process each sample and count the number of either above-threshold or below-threshold samples during a preset confirmation period. A touch alarm is generated when a preset number of above-threshold samples is reached before the confirmation period ends or, if counting below-threshold samples, the preset number is not reached before the end of the confirmation period. Another method employing an up/down counter counts up on above-threshold samples and down on below-threshold samples (or vice versa) and alarms when a predetermined number of excess samples of the first are detected.

DETAILED DESCRIPTION OF THE INVENTION

The mounting location of the vibration sensor for tool touch detection is determined individually for each machine tool to be monitored. There is a wide variety of lathes with which the machine tool monitor system can work. There are lathes with horizontal spindles and lathes with vertical spindles. Some lathes have only a single tool holder mounting position, while others have several, and in the latter case several tool holder positions may be distributed around the periphery of a turret that can be rotated to bring into cutting position any tool the operator selects. Some lathes may have mounted on them auxiliary power equipment such as automatic tool changers. The monitor has some applicability to other types of machine tools such as milling machines, machining centers, and drills.

There are a number of sometimes conflicting objectives to be traded off in selecting and evaluating a sensor mounting location on a machine tool. Among these are the following. First, acoustic coupling of the band of vibration signals containing the tool touch signal information. These signals are generated at or near the interface between the cutting tool insert and the workpiece. Before they can be detected they must propagate to the sensor location. Attenuation and distortion in the propagation path are functions of path distance and geometry, and especially of the number of mechanical interfaces between source and sensor. Second, location of spurious signal sources. Some sources of spurious signals are located near the desired signal sources and reach the sensor through the same or similar paths. However, on any given machine, sources like hydraulic valves, bearings, and auxiliary equipment may have other locations with more or less favorable propagation paths to a particular sensor mounting location. It is desirable that the sensor be mounted where its acoustic coupling to the signal sources is relatively good, and its acoustic coupling to major interference sources is relatively poor. Third, physical protection of the sensor and its cabling. The best sensor location from an acoustic coupling standpoint is probably on the tool holder near the cutting edge of the tool insert. However, such a mounting position exposes the sensor, its cable, and cable connectors to an extremely hostile physical environment in terms of forces, temperature, and cutting fluid contamination. Fourth, minimization of sensors and sensor signal processing channels. In machines with several holder mounting positions, a decision to mount the sensor on the tool holder implies a sensor and signal processing channel for each tool holder mounting position. This is highly undesirable. Fifth, available physical space, which varies greatly from machine to machine. The sensor and integrated electronics package of this invention is physically very small, thus increasing the mounting location options available.

Figure 1:
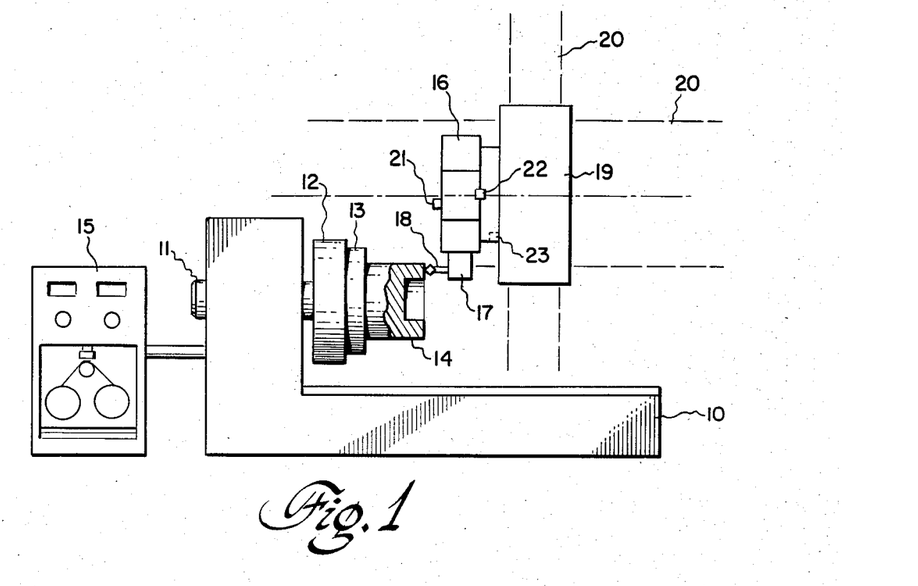
FIG. 1 is a fragmentary elevational view of a horizontal turret lathe showing alternative positions of the accelerometer.

FIG. 1 is a simplified drawing of part of a horizontal turret lathe having a machine frame 10, spindle shaft 11, chuck 12, fixture 13 for holding the workpiece 14, and a NC control station 15. A rotatable tool turret 16 has several tool posts 17 to support the tool holder and insert 18. The turret 16 is supported on a turret mount 19 which in turn has movement along the two cross slides 20.

A vibration sensor 21 such as a broadband accelerometer is mounted on turret 16; thus a single sensor in a single mounting position can monitor any tool holder position the operator selects for the cutting operation. This mounting location will usually provide a satisfactory signal to spurious noise ratio. Since the turret can be rotated, and in many machines only in one direction, the sensor cannot be electrically connected to stationary signal processing electronics through simple cables. A rotating electrical coupler 22 is one way of transferring the electrical signal outputted by the transducer. Optionally, the vibration sensor 23 is mounted on the cross slide where tests have shown that good operation is obtained on some lathes. Whether the sensor can be mounted off the turret is a matter that must be experimentally determined on each machine to be monitored.

Figure 2:
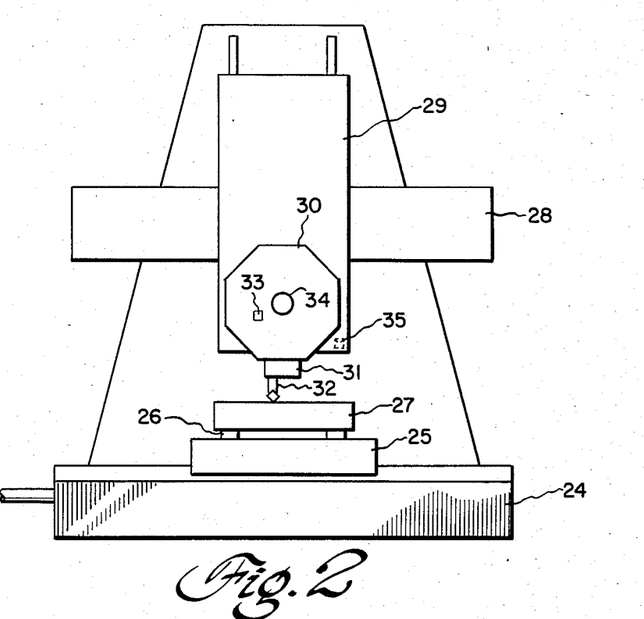
FIG. 2 is a simplified elevational view of a vertical turret lathe and alternative sensor positions.

A vertical turret lathe is illustrated in FIG. 2 and two suitable vibration sensor mounting locations are shown. The parts shown are: the machine frame 24, chuck 25, work holding fixture 26, workpiece 27, cross slide 28, vertical slide 29, rotatable tool turret 30, tool post 31, and tool holder and cutting insert 32 (the numerical control unit is not shown). The vibration signal generated by turret-mounted sensor 33 is transmitted through the rotating electrical coupling 34 to the tool touch detection circuitry. An alternative mounting location is on one of the machine tool slides; sensor 35 is in good acoustic contact with vertical slide 29.

Figure 3:
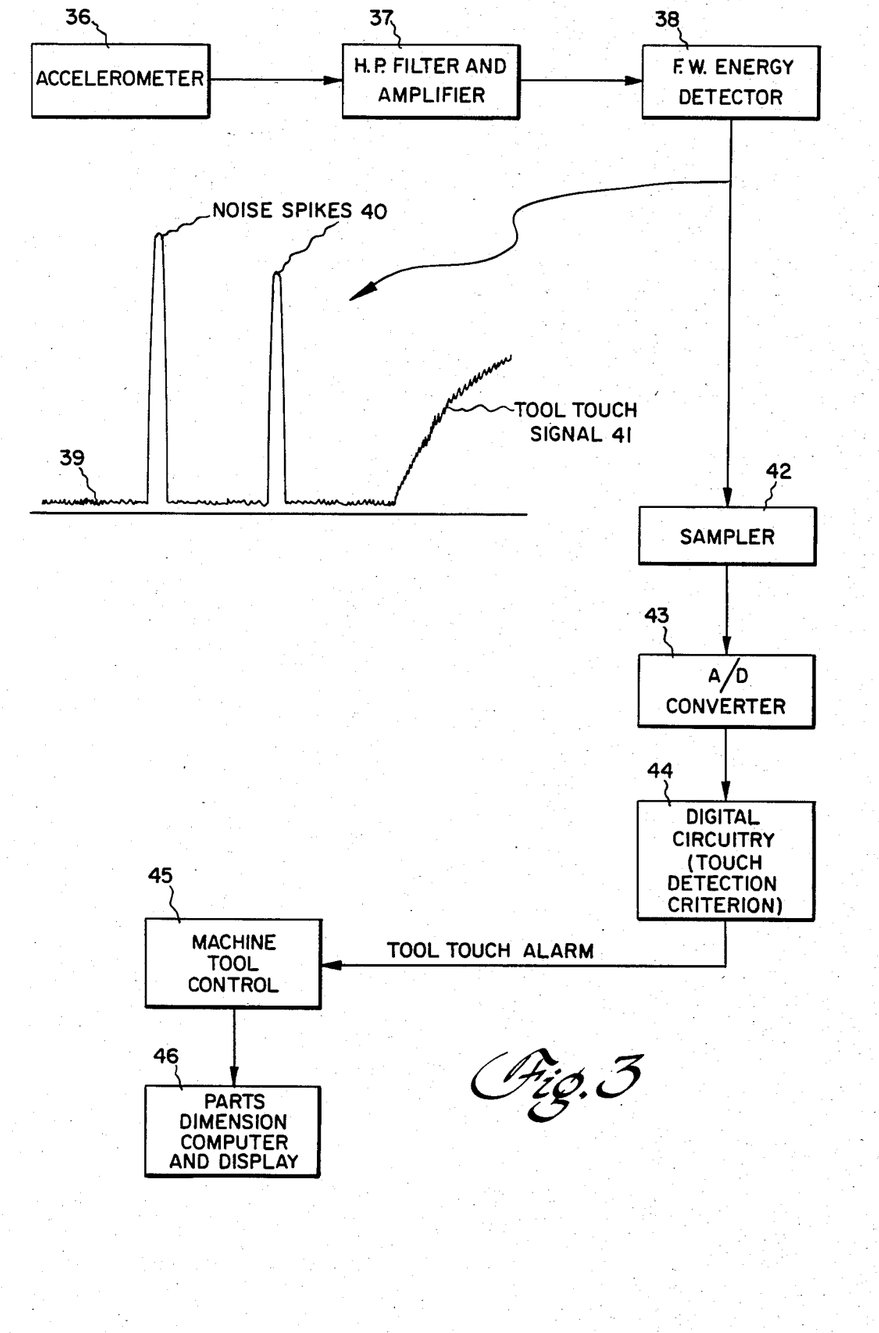
FIG. 3 is a block diagram of the tool touch detection system.

The main features of the tool touch detection system are indicated in FIG. 3. The sensor is a broadband accelerometer 36 with flat response from very low frequencies to just below its resonant frequency in the vicinity of 40 KHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibrametrics VM 1018 accelerometer (Vibra-Metrics, Inc., Hamden, CT). During an operation to check workpiece dimensions, tool holder and cutting insert 18 (FIG. 1) are moved rapidly toward workpiece 14 and then slowed down to a rate of about 1 inch/minute until contact is made. Continuous traverse noise, the background noise produced by normal operation of the machine tool with no tool-workpiece contact, is sensed. On some machine tools spiky noise of short duration but high amplitude is encountered, and others are relatively quiet and do not generate such noise pulses. There is a sudden and substantially continuous increase in vibration level when the slowly advancing tool insert first touches the workpiece. These vibrations are sensed by the accelerometer and converted to an electrical signal.

The vibration signal is high-pass filtered in a filter 37 with a cutoff frequency slightly below the resonant frequency of the sensor to discriminate against high amplitude machinery noise, which tends to be concentrated at lower frequencies. The combination of the resonant accelerometer and the high-pass filter produces a band-pass filtering of the vibration signals that favors frequencies in about a 20 KHz band in the vicinity of the accelerometer resonance frequency. The high-pass filter has a high gain, about 60 or 70 db, to raise the weak tool touch signal from the sensor to a level compatible with the needs of the subsequent rectifier stage of the system.

A full wave rectifier and low-pass filter combination acts as a full wave energy detector 38 (the filtering is too heavy for true envelope detection), converting the bipolar sensor signal to a unipolar "envelope" signal. The cutoff frequency of the low-pass filter is typically 500 Hz to prevent aliasing from the subsequent sampling operation as long as the sampling frequency is well above the 1 KHz Nyquist frequency. Thus, the sampling period can be long enough to accomplish the necessary digital analysis of the signal between analog signal samples. The cutoff frequency of the low-pass filter in fact may be as low as 100 Hz. The unipolar signal at the output of the analog preprocessor is shown in FIG. 3. The low continuous traverse noise signal is indicated at 39, high amplitude noise spikes at 40, and the gradually rising tool touch signal at 41. As was mentioned, some lathes and machine tools have pre-touch vibration signals that do not exhibit such noise spikes.

The signal samples of the output of the analog signal processing, extracted by sampler 42, are next converted to digital form by the analog-to-digital converter 43, and are further processed and analyzed by digital circuitry 44, which can be in the form of a programmable general purpose computer. When the digital circuitry recognizes a signal pattern associated with a tool touch event, satisfying a given touch detection criterion, it generates a touch alarm signal. This signal is fed to the machine tool control 45, which stops the advance of the tool and measures the travel of the tool from a starting reference to the workpiece surface. The parts dimension computer and display 46 converts this information to part dimension and displays the result.

Figure 4:
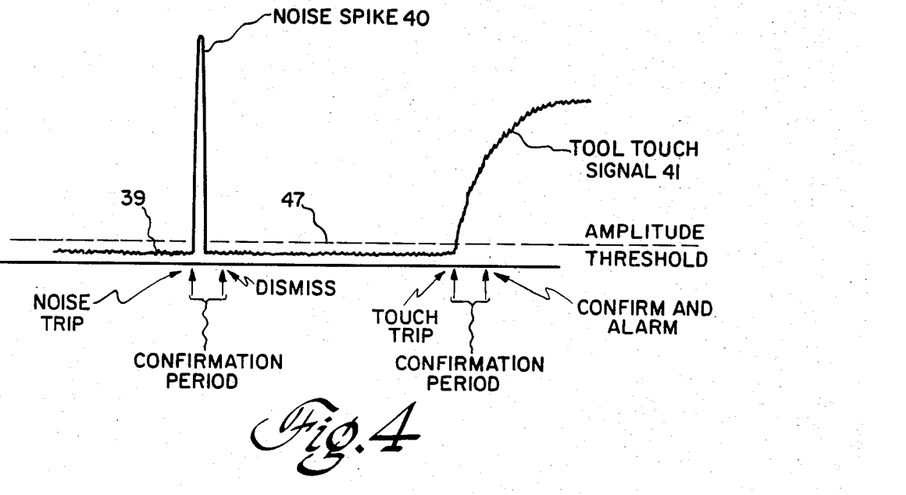
FIG. 4 shows the vibration signal at the output of the analog signal processing where spiky noise is present and the trip and confirm touch detection technique.

The tool touch detection system ignores any noise spikes that may be present and alarms a few milliseconds after the tool first contacts the workpiece. False alarms that would be triggered by the noise spikes are prevented. FIG. 4 illustrates one method, the trip and confirm tool touch detection technique, that allows the tool touch detector to reject noise spikes while still detecting the tool touch signal. An amplitude threshold level 47 is selected and preset and is a minimum factor above, say 2 to 3 times, the signal peaks of the continuous traverse noise produced by operation of the machine tool with no tool-workpiece contact. If desired, the threshold level may track variations in the machine tool operating noise level. When the noise spike 40 crosses the amplitude detection threshold it is detected and trips the detector. The algorithm enters a confirmation period set to be slightly longer than the known maximum duration of noise pulses. During this confirmation period the algorithm continuously checks for signal samples above the amplitude threshold. When less than a preset number, N, of such samples is detected during the confirmation period, the noise pulse is rejected or dismissed as a false touch signal. When the signal rises above the amplitude threshold 47 due to tool-workpiece rubbing contact, the algorithm again enters the confirmation period. This time the signal samples remain above the amplitude threshold 47 throughout the confirmation period, and a tool touch alarm is generated when the preset number, N, of above-threshold samples is reached before the timeout of the confirmation period. Alternately, below-threshold samples may be used. In this case, the detection logic is inverted. An alarm is generated if N samples are not counted during the confirmation period, where N is now the preset number of below-threshold samples.

Figure 5A:
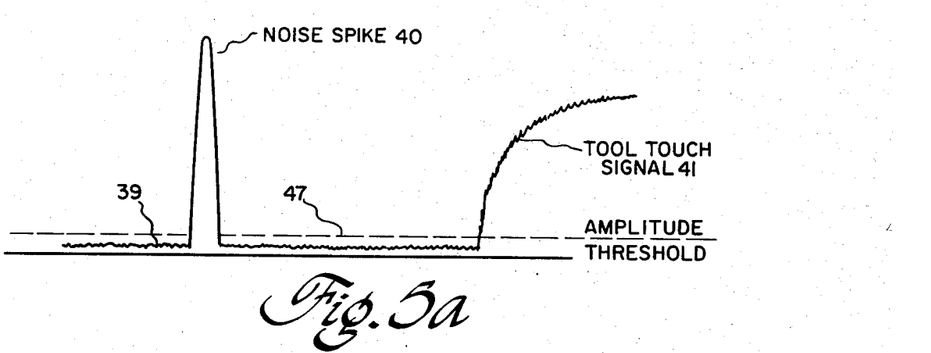
FIGS. 5a and 5b relate to the up/down counter touch detection technique and illustrate the vibration signal and counts in the up/down counter.
Figure 5B:
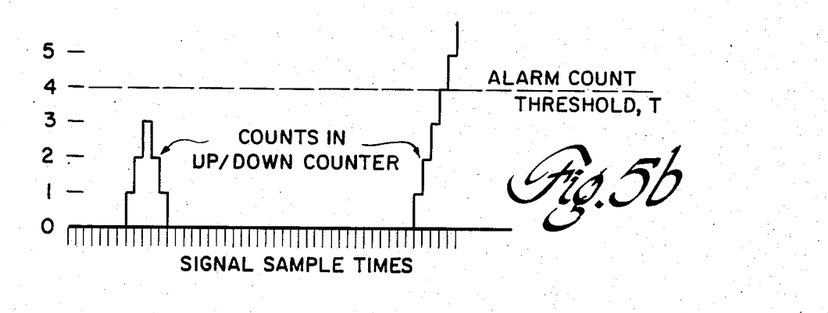

FIGS. 5a and 5b illustrate another method, the up/down counter tool touch detection technique, allowing the tool touch detector to ignore noise spikes while still detecting the tool touch signal. An up/down counter, part of digital circuitry 44, with a preset tool touch alarm threshold of T counts is arranged to count up toward the alarm threshold whenever a signal sample amplitude exceeds the amplitude threshold, and to count back down away from the alarm threshold whenever a signal sample amplitude is less than the amplitude threshold. Alternatively, the counter may count down on above-threshold samples and count back up on be-low-threshold samples, in which case the alarm threshold can be set at zero counts. The alarm count threshold T is set to exceed the number of signal samples that can occur during the longest expected noise spike duration so that no single noise spike can produce an alarm. For instance, in FIG. 5b the threshold T is four counts (in practice it is a much larger number of counts). At the second through fifth sample times after detecting an above-threshold sample, two above-threshold samples cause the counter to increment and the below-threshold samples cause the counter to decrement back to zero. The noise spike is ignored and there is no alarm. A valid tool touch signal 41 produces above-threshold samples throughout the confirmation period. The counter is incremented as each sample is detected and analyzed, and at four counts the touch alarm is generated. The tool touch signal remains high for more than T samples and produces a tool touch alarm on the Tth signal sample after the touch signal first exceeds the amplitude threshold. The count down rate can be set to exceed the count up rate to avoid alarms on closely-spaced noise spikes.

Figure 6A:
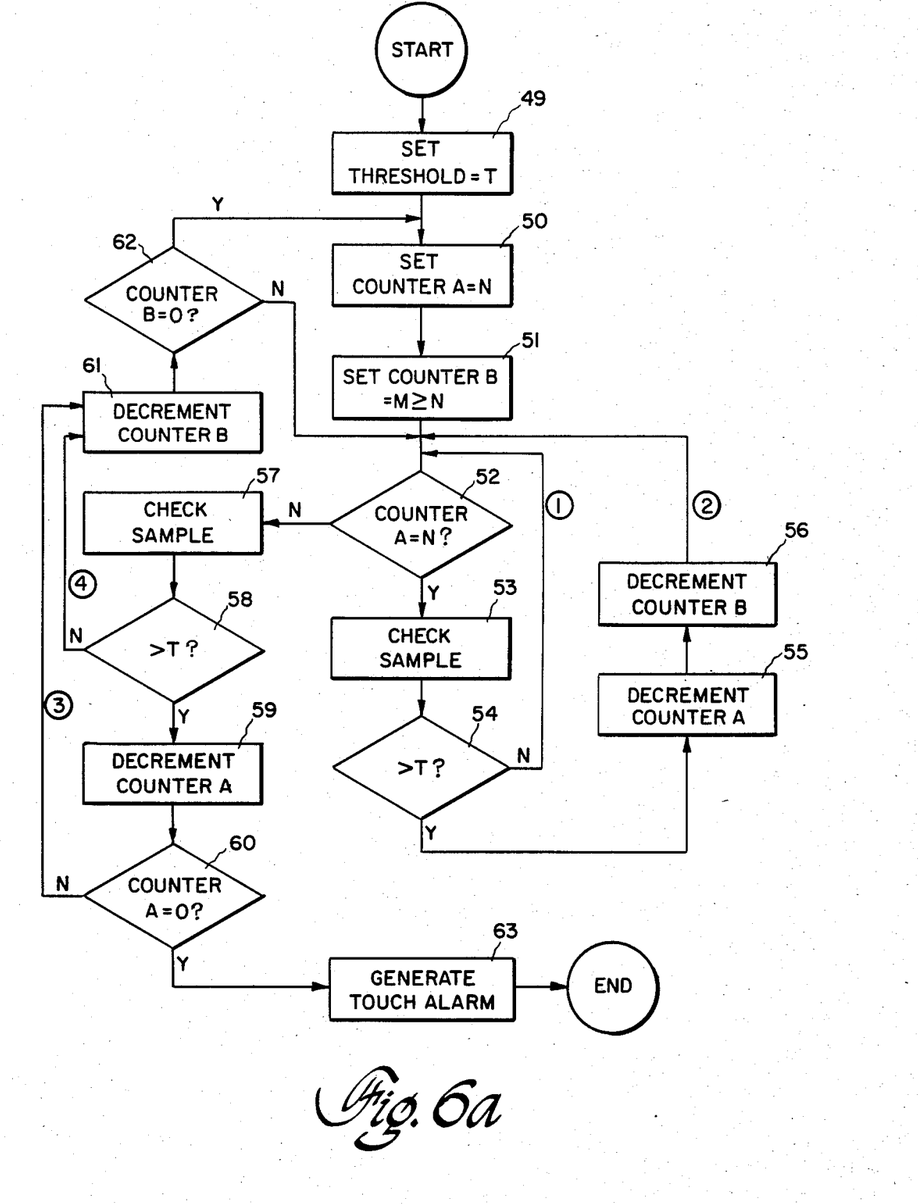
FIG. 6a is a program flowchart for the first (trip and confirm) technique utilizing above-threshold samples.

FIG. 6a shows a flowchart and tool touch signal pattern recognition logic to implement the trip and confirm touch detection technique in FIG. 4 utilizing above-threshold samples. Digital circuitry 44, which may be a programmed computer, has two counters which both count down to zero, contrary to that in FIG. 5b which starts at zero and counts up. Counter B counts all signal samples starting on the first sample greater than the threshold, and resets when it decrements to 0. This counter determines the confirmation period. Counter A counts only signal samples greater than the threshold, and resets when counter B decrements to 0. An alarm is generated when counter A decrements to 0. The first step 49 after the start is that the operator sets the threshold=T; the threshold is actually a number of counts of ADC 43, FIG. 3, where one count represents about 2.5 millivolts. The next steps 50 and 51 are that counter A is set at N and counter B at M, where M is greater than or equal to N (M and N are inputted by the operator at step 49). For this example both N and M are three counts to simplify the description of the operation of the logic, but the actual sample periods used and noise spike durations encountered are such that N would normally be set to about 15 and M about 20.

Figure 6B:
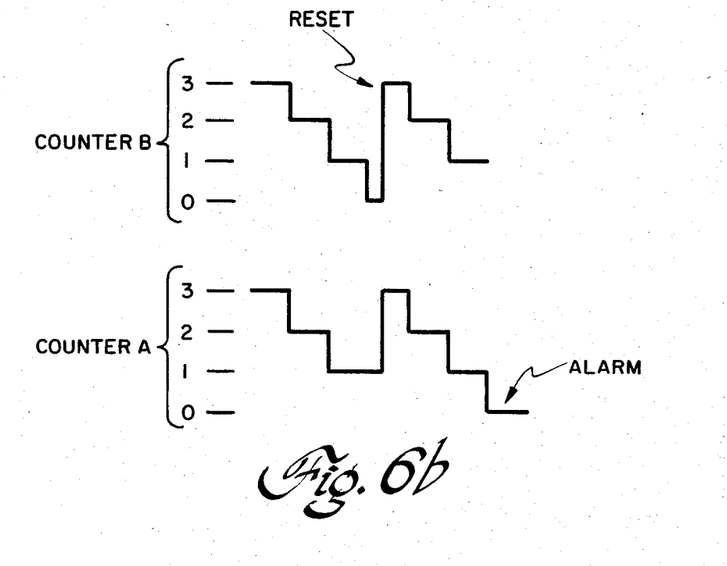
FIG. 6b shows the counts in the counters A and B.
Figure 6C:
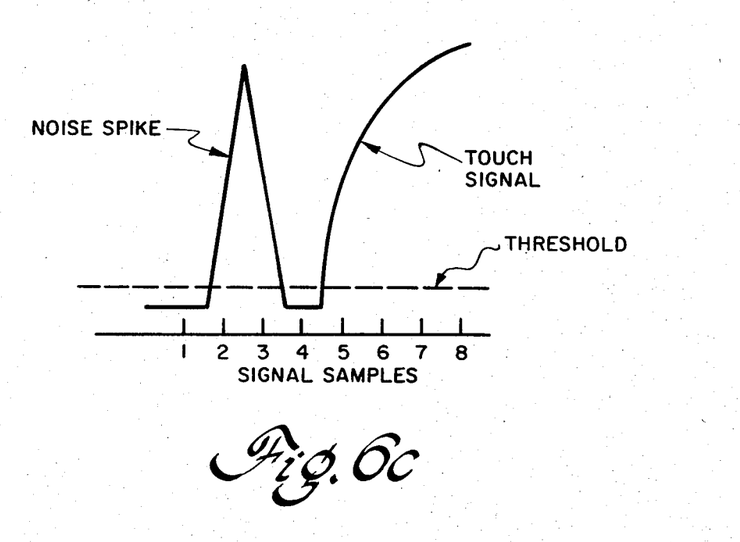
FIG. 6c shows the noise spike and touch signal at several sample times.

Referring to FIGS. 6a–6c, counter A is initially at N=3 counts. In step 52 it is determined that counter A, which counts all signal samples above threshold, is at N and therefore at step 53 sample 1 is checked. Step 54 calls for comparing the sample amplitude to the threshold amplitude; it is below the threshold. Nothing changes and according to logic loop (1) the next sample is checked. Note that logic loop (1) is followed if the signal is less than the threshold; neither counter is changed. At signal sample 2, the noise spike signal is above the threshold and counter A is at N=3 counts. After performing steps 52–54, steps 55 and 56 call for decrementing both counters A and B to 2 via logic loop (2). Upon detecting one above-threshold sample, logic loops (1) and (2) are not followed. At signal sample 3 the noise spike signal is above-threshold and counter A is now at 2 (not equal to N) counts. At step 52 the branch is made to step 57 to check the next sample and hence to steps 58–61. The sample is above the threshold, decrementing counter A, followed by testing to see if counter A=0 (it is not), and decrementing counter B.

Thus, both counters are decremented to 1 via logic loop (3). Step 62 checks if counter B=0; it is not and steps 52 and 57 indicate that the next sample is checked. At signal sample 4 the noise spike has terminated, so the signal is below-threshold. At step 58 the branch is made to logic loop (4) and only counter B is decremented. Since counter B is now 0, step 62 directs that both counters are reset to 3 per steps 50, 51.

At signal sample 5, the touch signal has started and the signal is above threshold. Both counters A and B are decremented to 2 via logic loop (2). At signal sample 6, the touch signal continues to rise, so an above-threshold sample is detected. Counter A is at 2 (not equal to N), and both counters are decremented to 1 via logic loop (3). At signal sample 7, the touch signal continues to rise so the signal remains above threshold. Counter A is decremented to 0 at step 59 and at step 60 the branch is made to step 63 and a touch detection alarm is generated. This is the end of the program.

To summarize, both counters are started by an above-threshold sample. Counter B, which determines the confirmation period, counts M subsequent samples before resetting itself and counter A. When counter A is set to count subsequent above-threshold samples, an alarm indicating a tool touch confirmation is generated if N counter A counts accumulate before counter A is reset by counter B. Otherwise, both counters are reset until another above-threshold sample starts another confirmation period of M counter B counts.

Figure 7A:
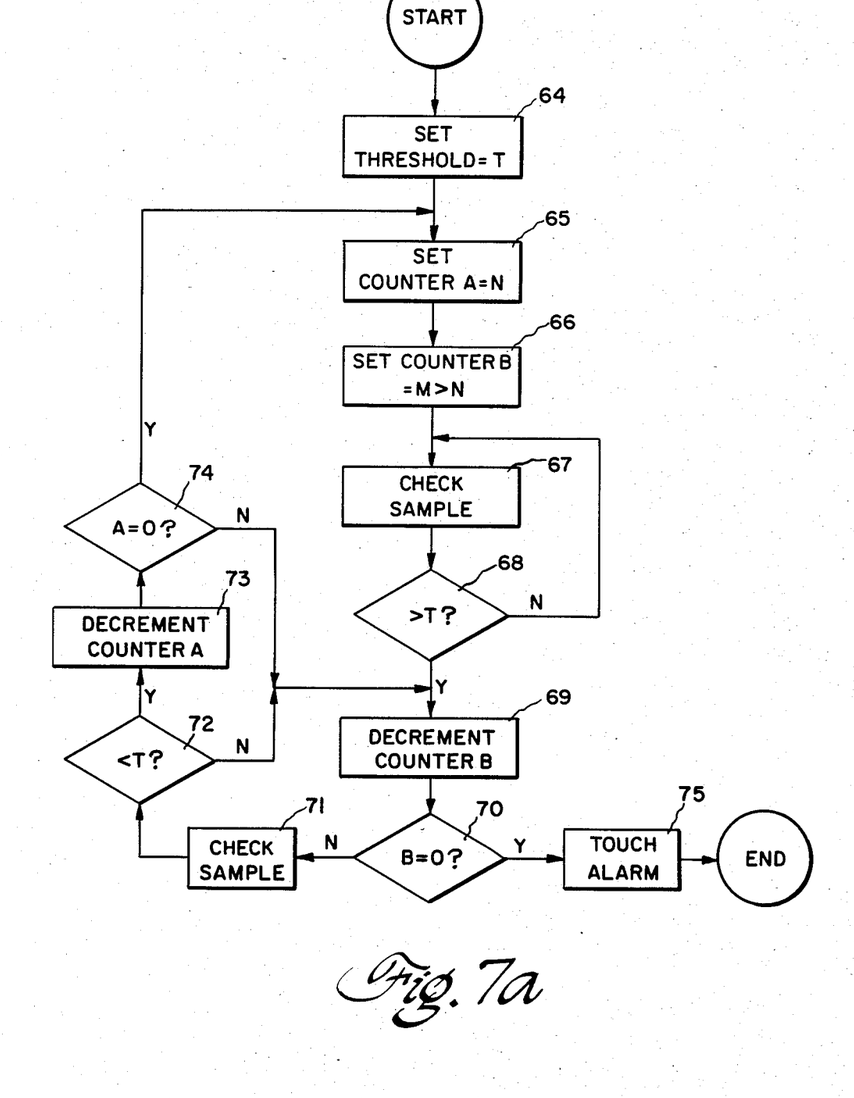
FIGS. 7a–7c relate to an alternate approach utilizing below-threshold samples and illustrate the flowchart, count sequence, and noise and touch signals.
Figure 7B:
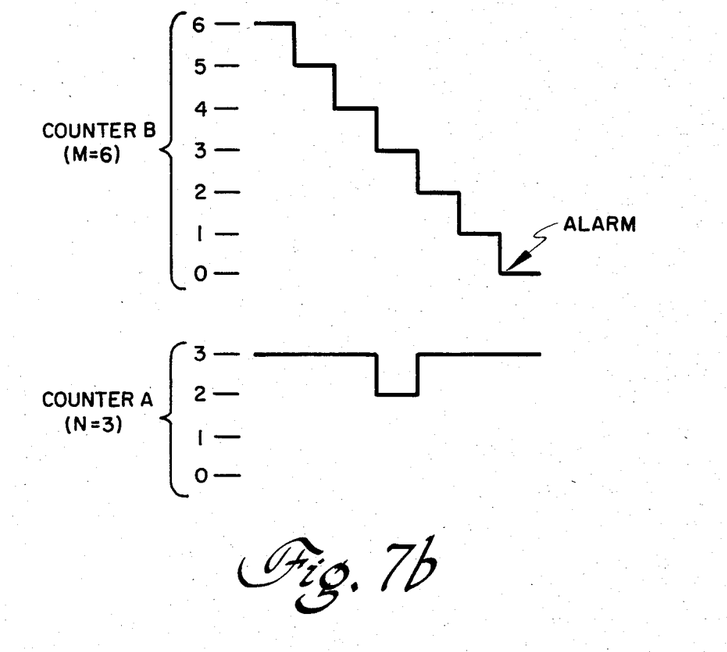
Figure 7C:
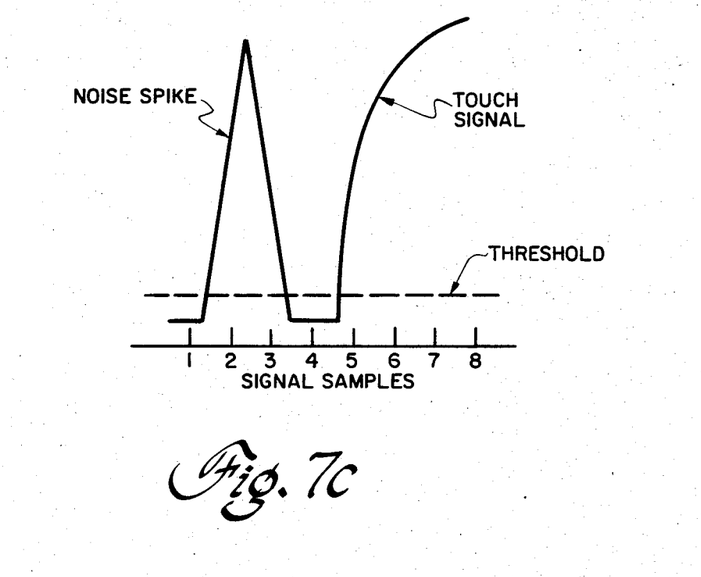

Alternately, referring to FIGS. 7a-7c, counter A may be set to count subsequent below-threshold samples. An alarm indicating a tool touch confirmation is generated when N counter A counts do not accumulate before B is reset by A. Both counters are reset if N counter A counts accumulate. In the example of FIGS. 7b and 7c for this alternative, M=6 and N=3. Steps 64-66 are the same as in the first approach. According to steps 67 and 68, sample 1 is checked, is below the threshold, and the next sample is checked. Sample 2 is above the threshold; according to steps 69-71, counter B is decremented, is not at 0, and sample 3 is checked. It is not below the threshold (step 72), and counter B is again decremented. Tracing through the logic loop, signal sample 4 is below the threshold, and by steps 72-74 counter A is decremented, is not at zero, and counter B is again decremented. Samples 5-7 are all above the threshold, decrementing counter B several times until B=0; the branch is made at step 70 to generate a touch alarm (step 75). If there are no below-threshold samples, as on a quiet machine tool, counter B goes to zero directly after a given number of counts and the alarm is generated. Note that a noise spike is dismissed promptly upon detecting a certain number of below-threshold samples.

Figure 8A:
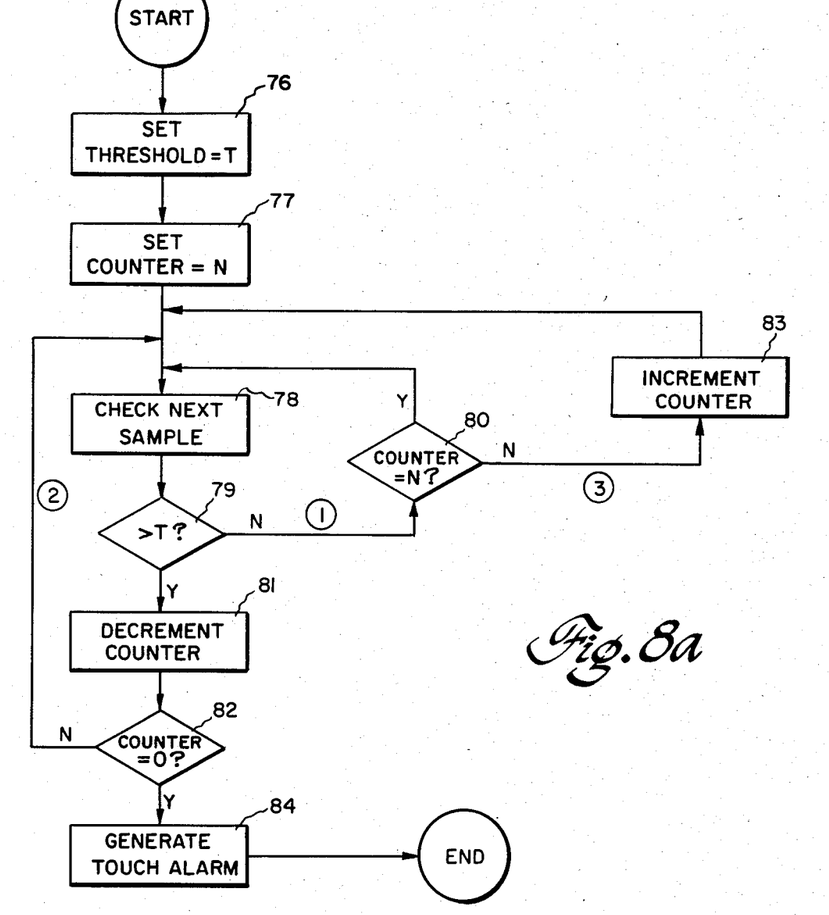
FIG. 8a is a program flowchart for the second (up/down counter) technique.
Figure 8B:
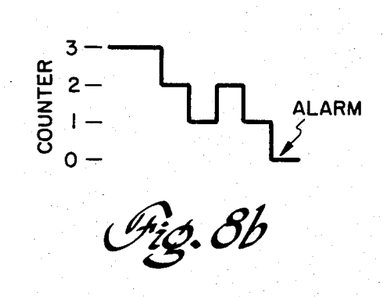
FIG. 8b shows the counts to a valid alarm.
Figure 8C:
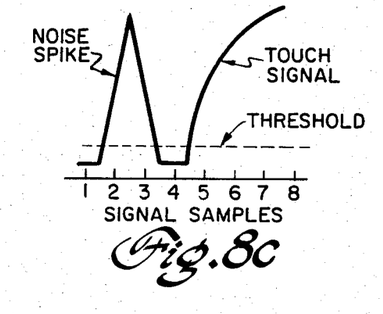
FIG. 8c shows the noise spike and touch signal at several sample times.

FIG. 8a is a flowchart to implement the up/down counter technique in FIGS. 5a and 5b and shows the tool touch signal pattern recognition logic. This method employs one counter which counts up if the sample is below threshold and counts down if the sample is above threshold. The system alarms when the counter decrements to zero. The first steps 76-78 after the start are that the operator sets the threshold=T and the counter=N and the sample is checked. For this example, N=3 to simplify the explanation. Signal sample 1 is below the threshold and the counter is set to N. Logic loop (1) including steps 79 and 80 is followed and the next sample is checked. Signal sample 2 is a noise spike signal and the counter is still at N. Via logic loop (2) and steps 81 and 82, the counter is decremented to 2, it is not at 0, and the next sample is checked. Signal sample 3 on the noise spike is above threshold and by the same logic loop the counter is decremented to 1. Signal sample 4 is below threshold because the noise pulse has terminated. At step 80, logic loop (3) is followed and, by step 83, the counter is incremented back to 2.

Signal sample 5 is at the start of the touch signal and is above threshold. Per logic loop (2) the counter is decremented back to 1. Signal sample 6 is taken from the rising touch signal and remains above the threshold. At steps 81 and 82, the counter is decremented to 0 and the branch is made to step 84 and the touch alarm is generated. This is the end of the program. The number of above-threshold samples must exceed the number of below-threshold samples by a predetermined number before an alarm is generated. If the lathe or other machine tool to be monitored has a relatively quiet operating mechanism and generates no noise pulses whose amplitude exceeds the established amplitude threshold, the tool touch signal pattern recognition logic in either FIG. 6a, 7a or 8a will follow its normal routine and detect the gradually rising tool touch signal and generate a valid alarm. Concerning FIG. 6a, logic loop (1) is followed until the signal samples exceed the threshold. The first above-threshold sample causes both counters to be decremented via logic loop (2). Thereafter, the samples are above threshold, counter A is not at N, and logic loop (3) is run around several times until the alarm is generated. FIG. 7a has been covered. With regard to FIG. 8a the samples are below threshold and logic loop (1) is gone through until an above-threshold sample is detected. Thereafter logic loop (2) is gone through several times until the alarm is generated.

The vibration-sensing tool touch detection system has utility as a stand alone product and as an option in a numerical machine tool control. The advantages of using the cutting tool as a probe for on-line workpiece dimension checking have been explained. Another advantage of this touch detector and method is that it is readily combined with an acoustic tool break detector in a tool touch and tool break detecting system.

While the invention has been particularly shown and described with reference to preferred embodiments thereof, it will be understood by those skilled in the art that the foregoing and other changes in form and details may be made without departing from the spirit and scope of the invention.

What is claimed is:

1. An improved system for acoustic detection of the initial touch of a cutting tool to a workpiece on a machine tool comprising:

a vibration sensor which is most sensitive to frequencies around a resonant frequency and is positioned on said machine tool to sense vibrations at the tool-workpiece interface and convert these and other vibrations to an electrical signal;

an analog preprocessor including means to high-pass filter and amplify said vibration signal to discriminate against lower frequency machinery noise, and means to rectify and low-pass filter said signal and detect the energy in a band around said resonant frequency;

means for sampling the signal at the preprocessor output and converting each sample to digital form; and digital signal pattern recognition circuitry comprising means for comparing each sample with a preset amplitude threshold level which is a minimum factor above the continuous noise level produced by operation of said machine tool with no tool-workpiece contact, and means for detecting a sample amplitude above said threshold and then confirming detection of a tool touch signal while ignoring pre-touch high amplitude spiky noise pulses, and generating a touch alarm signal to be sent to the machine tool control to stop the advance of said cutting tool.

2. The system of claim 1 wherein said vibration sensor is a high frequency accelerometer having a resonant frequency of above 40 KHz.

3. The system of claim 1 wherein said low-pass filter means has a cutoff frequency less than 500 Hz and said sampling means has a sampling frequency greater than 1 KHz to prevent aliasing.

4. A tool touch monitor to detect contact between a cutting tool insert and a workpiece on a machine tool comprising:
a broadband vibration sensor which generates an electrical signal representing vibrations at the insert-workpiece interface and other machine tool noises;
analog signal processing means including means for high-pass filtering and amplifying said vibration signal to discriminate against lower frequency machinery noise, and full wave energy detector means for rectifying and low-pass filtering said signal;
means for sampling the output signal of said analog processing means and converting each sample to digital form;
digital pattern recognition circuitry comprising means for checking every signal sample and detecting when the signal amplitude is greater than a set threshold level which exceeds continuous traverse noise signal levels by a minimum factor, means for rejecting above-threshold spiky noise pulses as false touch alarms while still detecting valid touch signals that remain above-threshold during a given confirmation period, and means for generating a touch alarm signal to be used to stop the advance of said cutting tool insert.

5. The system of claim 4 wherein said means for rejecting noise pulses and detecting tool touch signals comprises means for counting above-threshold samples during said confirmation period and rejecting when a preset number of above-threshold samples are not detected during said confirmation period.

6. The system of claim 5 wherein said counting means is comprised of two counters, one of which counts all samples and the other counts only said above-threshold samples.

7. The system of claim 4 wherein said means for rejecting noise pulses and detecting tool touch signals comprises means for counting below-threshold samples during said confirmation period and rejecting spiky noise pulses when a preset number of below-threshold samples are cetected during said confirmation period.

8. The system of claim 4 wherein said means for rejecting noise pulses and detecting tool touch signals comprises an up/down counter which counts up on above-threshold samples and down on below-threshold samples, or vice versa, and generates an alarm when the number of above-threshold samples exceeds the number of below-threshold samples by a predetermined number.

9. The system of claim 4 wherein said vibration sensor is a high frequency accelerometer, and said energy detector means is comprised of a rectifier and a low-pass filter having a cutoff frequency less than 500 Hz to provide anti-aliasing filtering at the signal sampling rate of said sampling means.

10. A method of detecting the initial touch of a cutting tool insert to a workpiece on a machine tool comprising:
sensing the vibrations of said machine tool as said tool insert slowly advances toward the workpiece and makes rubbing contact, and converting said vibrations to an electrical signal;
preprocessing said vibration signal by amplifying and band-pass filtering to discriminate against lower frequency machinery noise, and rectifying and low-pass filtering to detect the energy in the band, the output signal containing a tool touch event signature, high amplitude noise spikes generated by the machine tool mechanism, and continuous traverse noise;
sampling said output signal and converting each sample to digital form;
checking every signal sample against an amplitude detection threshold higher than the continuous traverse noise signal level of said machine tool, detecting an above-threshold sample and subsequently checking for either one of above-threshold and below-threshold samples during a confirmation period longer than the known maximum duration of high amplitude spiky noise pulses and ignoring said noise pulse as a false alarm, and generating a tool touch alarm when above-threshold samples are detected throughout said period.

11. The method of claim 10 wherein said amplitude detection threshold is preset and is about two to three times the signal peaks of said continuous traverse noise signal.

12. The method of claim 11 wherein said above-threshold and below-threshold samples are counted in a first counter and only said above-threshold samples are counted in a second counter, both counters being reset after the first counts a preset number of samples, and the second generating said touch alarm after counting a preset number of above-threshold samples before said period ends confirmation.

13. The method of claim 11 wherein said below-threshold samples are counted and said alarm is generated when a preset number are not counted before the end of said period confirmation.

14. The method of claim 10 wherein no high amplitude noise spikes are generated by the machine tool mechanism, and said touch alarm is generated directly after counting a preset number of said above-threshold samples.

* * * * *